United States Patent
Skowronski

Patent Number: 6,032,459
Date of Patent: Mar. 7, 2000

[54] TURBINE EXHAUST COOLING IN A MICROTURBINE POWER GENERATING SYSTEM

[75] Inventor: Mark J. Skowronski, Walnut, Calif.

[73] Assignee: AlliedSignal, Inc., Morristown, N.J.

[21] Appl. No.: 08/994,217

[22] Filed: Jun. 15, 1998

[51] Int. Cl.[7] .................................................. F02C 7/10
[52] U.S. Cl. .................................. 60/39.511; 60/262
[58] Field of Search ........................ 60/39.5, 39.511, 60/39.512, 262, 266, 269

[56] References Cited

U.S. PATENT DOCUMENTS

| | | | |
|---|---|---|---|
| 2,538,701 | 1/1951 | Meyer | 60/39.511 |
| 4,095,417 | 6/1978 | Banthin | 60/39.5 |
| 4,555,902 | 12/1985 | Pilarczyk | 60/39.5 |

*Primary Examiner*—Louis J. Casaregola
*Attorney, Agent, or Firm*—Ephraim Starr

[57] ABSTRACT

A microturbine power generation system includes a turbine having a diffuser. A plurality of openings are located in the diffuser. When an exhaust stream is leaving the turbine, ambient air is drawn through the openings and into the turbine exhaust stream. The ambient air lowers the temperature of the turbine exhaust stream.

4 Claims, 2 Drawing Sheets

TURBINE EXHAUST COOLING IN A MICROTURBINE POWER GENERATING SYSTEM

BACKGROUND OF THE INVENTION

The present invention relates generally to microturbine power generating systems. More specifically, the present invention relates to modular, distributed power generating units.

The United States Electric Power Research Institute (EPRI) which is the uniform research facility for domestic electric utilities, predicts that up to 40% of all new generation could be provided by distributed generators by the year 2006. In many parts of the world, the lack of electric infrastructure (transmission and distribution lines) will greatly expedite the commercialization of distributed generation technologies since central plants not only cost more per kilowatt, but also must have expensive infrastructure installed to deliver the product to the consumer.

Small, multi-fuel, modular distributed microturbine generation units could help alleviate current afternoon "brownouts" and "blackouts" prevalent in many parts of the world. A simple, single moving part concept would allow for low technical skill maintenance and low overall cost would allow for wide spread purchase in those parts of the world where capital is sparse. In addition, given the United States emphasis on electric deregulation and the world trend in this direction, consumers of electricity would have not only the right to choose the correct method of electric service but also a new cost effective choice from which to chose. U.S. Pat. No. 4,754,607, which is assigned to the assignee of the present invention, discloses a microturbine power generating system suitable for cogeneration applications.

Yet to make these units commercially attractive to consumers, improvements are needed in areas such as increasing fuel-efficiency, reducing size and weight, and lowering thermal signature, noise, maintenance and cost penalties. For example, the units generate turbine exhaust streams that are very hot and, therefore, have high thermal signatures. Temperature of the exhaust stream is highest when a unit is operating at part-load. Before leaving the unit, heat from the exhaust stream is recuperated in a recuperator. However, if the temperature becomes too high, the recuperator can be damaged. Therefore, the turbine firing temperature is lowered during part-load operation to avoid damaging the recuperator. Consequently, efficiency of the unit is reduced.

There is a need to reduce the temperature of the turbine exhaust stream, without significantly lowering efficiency during part-load operation.

SUMMARY OF THE INVENTION

The present invention can be regarded as a microturbine power generating system including a compressor for providing a stream of pressurized air; a combustor for igniting a fuel and the pressurized air to generate a hot, expanding gas; and a turbine for converting the hot, expanding gas into mechanical energy. The turbine includes a diffuser for diffusing a turbine exhaust stream. The diffuser has a plurality of openings that allow ambient air to be drawn into the turbine exhaust stream. The turbine exhaust stream is cooled by the air drawn through the openings.

The microturbine power generating system also includes a recuperator for recovering heat from the exhaust stream leaving the diffuser. Cooling the turbine exhaust stream allows the turbine to be fired at higher temperatures without damaging the recuperator.

DESCRIPTION OF THE PREFERRED EMBODIMENT

Figure 1:
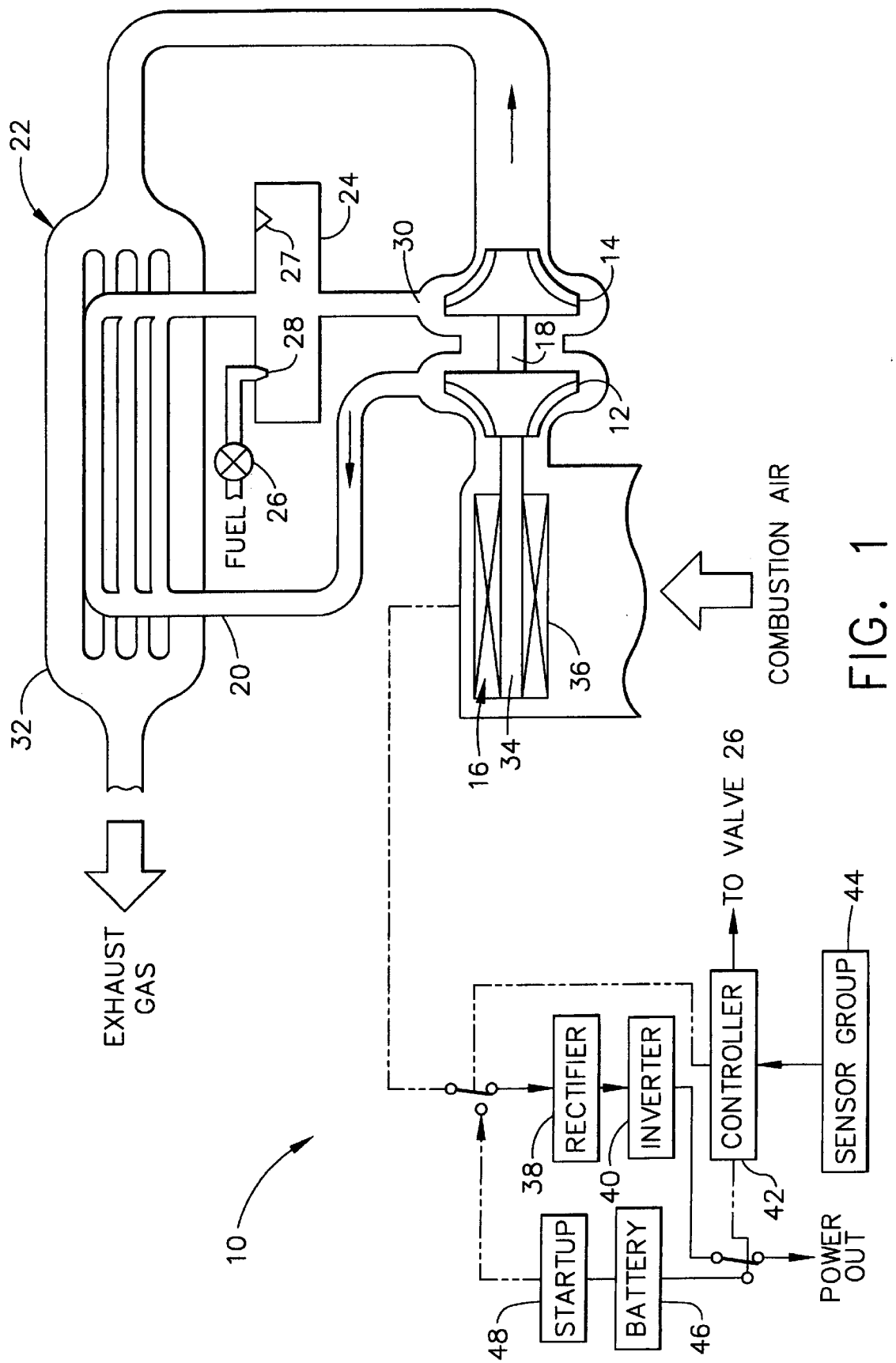
FIG. 1 is an illustration of a power generating system according to the present invention.

Referring to FIG. 1, a power generating system 10 according to the present invention is illustrated. The power generating system 10 includes a compressor 12, a turbine 14 and an electrical generator 16. The electrical generator 16 is cantilevered from the compressor 16. The compressor 12, the turbine 14 and the electrical generator 16 can be rotated by a single shaft 18. Although the compressor 12, turbine 14 and electrical generator 16 can be mounted to separate shafts, the use of a single common shaft 18 for rotating the compressor 12, the turbine 14 and the electrical generator 16 adds to the compactness and reliability of the power generating system 10.

Figure 2:
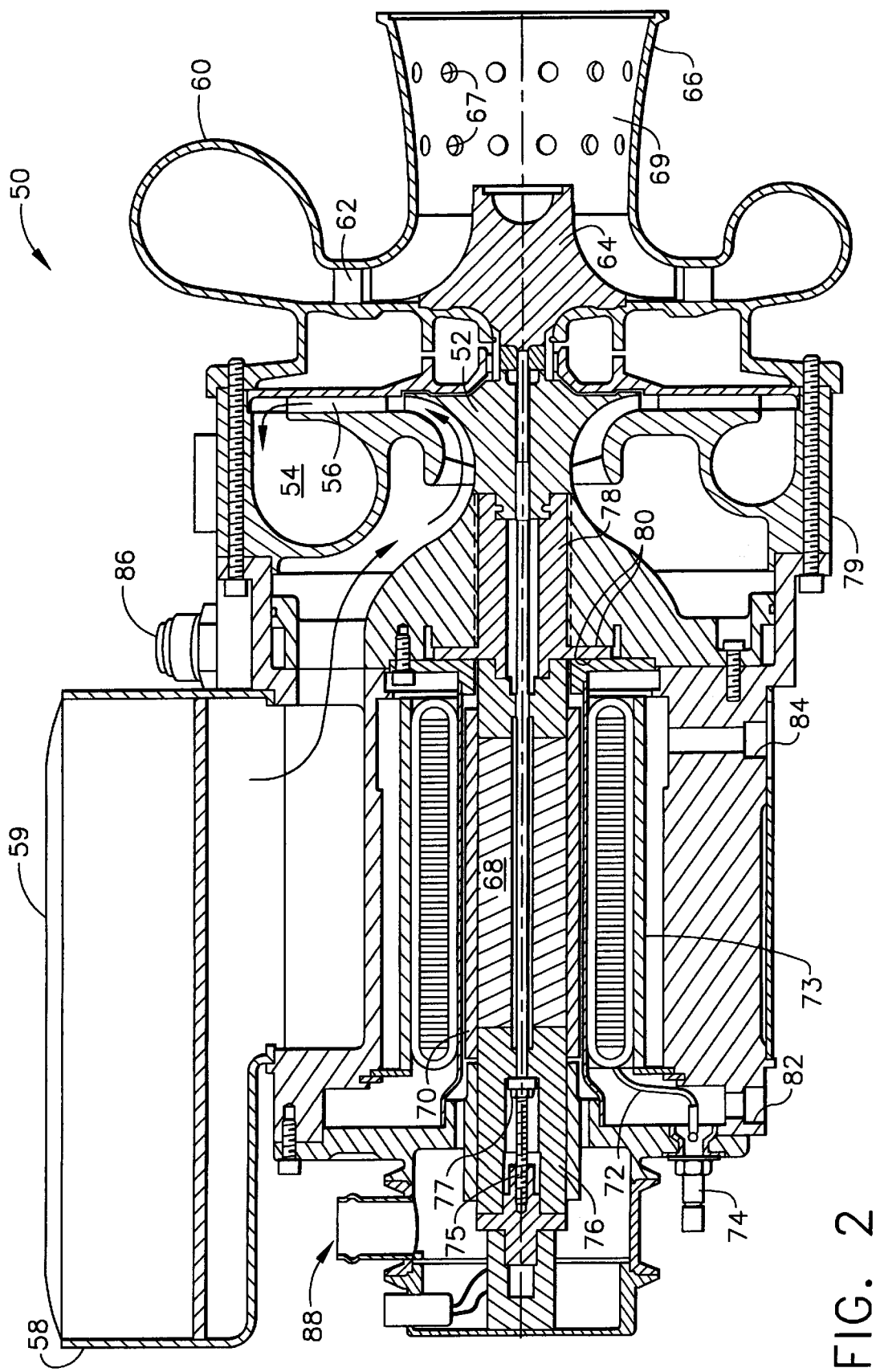
FIG. 2 is an illustration of an engine core for the power generating system.

The shaft 18 can be supported by self-pressurized air bearings such as foil bearings. As is shown in FIG. 2, the shaft 18 is supported by journal foil bearings 76 and 78 and thrust foil bearings 80. The foil bearings eliminate the need for a separate bearing lubrication system and reduce the occurrence of maintenance servicing.

Air entering an inlet of the compressor 12 is compressed. Compressed air leaving an outlet of the compressor 12 is circulated through cold side passages 20 in a cold side of a recuperator 22. In the recuperator 22, the compressed air absorbs heat, which enhances combustion. The heated, compressed air leaving the cold side of the recuperator 22 is supplied to a combustor 24.

Fuel is also supplied to the combustor 24. Both gaseous and liquid fuels can be used. In gaseous fuel mode, any suitable gaseous fuel can be used. Choices of fuel include diesel, flair gas, off gas, gasoline, naphtha, propane, JP-8, methane, natural gas and other man-made gases.

The flow of fuel is controlled by a flow control valve 26. The fuel is injected into the combustor 24 by an injection nozzle 28.

Inside the combustor 24 the fuel and compressed air are mixed and ignited by an igniter 27 in an exothermic reaction. In the preferred embodiment, the combustor 24 contains a suitable catalyst capable of combusting the compressed, high temperature, fuel-air mixture at the process conditions. Some known catalysts usable in the combustor 24 include platinum, palladium, as well as metal oxide catalyst with active nickel and cobalt elements.

Following combustion, hot, expanding gas of the combustion is directed to an inlet nozzle 30 of the turbine 14. The inlet nozzle 30 has a fixed geometry. The hot, expanding gas resulting from the combustion is expanded through the turbine 14, thereby creating turbine power. The turbine power, in turn, drives the compressor 12 and the electrical machine 16.

The turbine 14 includes a diffuser(see FIG.2). Exhaust gas flowing through the diffuser is reduced. Temperature of the turbine exhaust gas is circulated by hot side passages 32 in a hot side of the recuperator 22. Inside the recuperator 22, heat from the turbine exhaust gas on the hot side is transferred to the compressed air on the cold side. In this manner, some heat of combustion is recuperated and used to raise the temperature of the compressed air en route to the combustor 24. After surrendering part of its heat, the combustion products exit the recuperator 22. Additional heat recovery stages could be added onto the power generating system 10.

The generator 16 can be a ring-wound, two-pole toothless (TPTL) brushless permanent magnet machine having a permanent magnet rotor 34 and stator windings 36. The turbine power generated by the rotating turbine 14 is used to rotate the rotor 34. The rotor 34 is attached to the shaft 18. When the rotor 34 is rotated by the turbine power, an alternating current is induced in the stator windings 36. Speed of the shaft 18 can be varied in accordance with external energy demands placed on the system 10. Variations in the turbine speed will produce a variation in the frequency of the alternating current (i.e., wild frequencies) generated by the electrical generator 16. Regardless of the frequency of the ac power generated by the electrical generator 16, the ac power can be rectified to dc power by a rectifier 38, and then chopped by a solid-state electronic inverter 40 to produce ac power having a fixed frequency. Accordingly, when less power is required, the shaft speed and, therefore, the speed of the turbine 14 can be reduced without affecting the frequency of the ac output.

Moreover, reducing the shaft speed reduces the airflow because the compressor runs slower. Consequently, the turbine inlet temperature remains essentially constant, thus maintaining a high efficiency at part load.

Use of the rectifier 38 and the inverter 40 allows for wide flexibility in determining the electric utility service to be provided by the power generating system of the present invention. Because any inverter 40 can be selected, frequency of the ac power can be selected by the consumer. If there is a direct use for ac power at wild frequencies, the rectifier 38 and inverter 40 can be eliminated.

The power generating system 10 can also include a battery 46 for providing additional storage and backup power. When used in combination with the inverter 40, the combination can provide uninterruptible power for hours after generator failure.

During operation of the power generating system 10, heat is generated in the electrical generator 16 due to inefficiencies in generator design. In order to extend the life of the electrical generator 16, as well as to capture useful heat, compressor inlet air flows over the generator 16 and absorbs excess heat from the generator 16. The rectifier 38 and the inverter 40 can also be placed in the air stream. After the air has absorbed heat from the aforementioned sources, it is compressed in the compressor 12 and further pre-heated in the recuperator 22.

A controller 42 controls the shaft speed by controlling the amount of fuel flowing to the combustor 24. The controller 42 uses sensor signals generated by a sensor group 44 to determine the external demands upon the power generating system 10. The sensor group 44 could include sensors such as position sensors, shaft speed sensors and various temperature and pressure sensors for measuring operating temperatures and pressures in the system 10. Using the aforementioned sensors, the controller 42 controls both startup and optimal performance during steady state operation. The controller 42 can also determine the state of direct current storage in the battery 46 if supplied in the inverter 40, and adjust operations to maintain conditions of net charge, net drain, and constant charge of the battery.

A switch/starter control 48 can be provided offskid to start the power generating system 10. Rotation of the compressor 12 can be started by using the generator 16 as a motor. During startup, the switch/starter control 48 supplies an excitation current to the stator windings 34 of the electrical generator 16. Startup power is supplied by the battery 46. In the alternative, a compressed air device could be used to motor the power generating system 10.

Referring to FIG. 2, the "engine core" 50 of the power generating system 10 is shown. The compressor 12 includes an impeller 52 having a bore, a compressor scroll 54 and a diffuser channel 56. Air entering an air inlet 58 is filtered by an air filter 59 and directed to the compressor scroll 54. Air flowing out of the compressor scroll 54 is directed to the recuperator 22.

The turbine 14 includes a turbine scroll 60, a plurality of fixed nozzle vanes 62, and a boreless turbine wheel 64. Hot expanding gases leaving the combustor 24 are directed into the turbine scroll 60 and through the nozzle vanes 62, which redirect the hot expanding gas onto the turbine wheel 64. Turbine exhaust gas leaves the turbine 14 through an exhaust diffuser 66, which reduces the temperature and noise of the turbine exhaust gas.

A plurality of openings 67 are located in a sidewall 69 of the diffuser 66. The exhaust air leaving the diffuser 66 lowers the static pressure at the openings 67. The resulting decrease in static pressure causes ambient air to be drawn through the openings 67 and into the turbine exhaust stream. The temperature of the turbine exhaust stream is lowered by the ambient air drawn through the openings 67. As the velocity of the exhaust air increases, the differential between static and ambient pressures increase and, therefore, the amount of cooling of the turbine exhaust stream is increased.

The openings 67 are circumferentially disposed around the sidewall 69 of the diffuser 66. Additionally, the openings 67 are located along a transverse plane of the diffuser 66. The transverse plane is orthogonal to a longitudinal axis of the diffuser 66.

The rotor 38 of the electrical generator 16 includes magnets 68 made of a rare earth material such as samarium cobalt. The magnets 68 are surrounded by a containment sleeve 70 made of a non-magnetic material such as Inconel 718. The stator windings 40 are housed in a generator housing 73. The rotor 38 has a bore and an optional containment sleeve (not shown) contacting a surface of the bore. Power conductors 72 extend from the stator windings 40 and terminate in a power connector stud 74, which is secured to a base 79. The base 79 provides support for a fuel inlet, the air inlet 58, the compressor 12, the turbine 14, the generator 16, the recuperator 22, the combustor 24, the rectifier 38, and the inverter 40, to enable the system 10 to exist as a packaged unit.

The single shaft 18 is shown in FIG. 2 as a tieshaft 75, which extends through the bores in the rotor 38 and the compressor impeller 52. The tieshaft 75 is thin, having a diameter of approximately 0.25 inches to 0.5 inches or less. The bores have clearances that allow the tieshaft 75 to extend through the rotor 38 and the impeller 52. However, the tieshaft 75 does not extend through the turbine wheel 64. Instead, the tieshaft 75 is secured to the turbine wheel 64. The tieshaft 75 can be secured to the center of the turbine wheel hub by an inertia weld. Thus, the turbine wheel 64 is boreless in that it does not have a bore through which the tieshaft 75 extends. Eliminating the bore reduces stresses in the turbine wheel 64.

When clamped together by the tieshaft 18, the compressor impeller 52, the turbine wheel 64 and the rotor 38 are rotated as a single unit. Under high operating temperatures and rotational speeds, however, the impeller 52, the turbine wheel 64 and the rotor 38 tend to expand and grow apart and their faces tend to lose contact. Flexing of the tieshaft 75 during operation also tends to separate the faces. To maintain contact between the faces of the impeller 52, the turbine wheel 64 and the rotor at high rotational speeds (80,000 rpm and above), the tieshaft 75 is preloaded. For example, a tieshaft 75 made of Inconel 718 can be preloaded in tension to about 90% of yield strength. During assembly, the tieshaft 75 is preloaded, the impeller 52 and the rotor 38 are slid over the tieshaft 75, and a nut 77 is secured to a threaded end of the tieshaft 75.

The rotating unit 52, 64, 38 and 75 is supported in a radial direction by inboard and outboard foil journal bearings 76 and 78. The rotating unit 52, 64, 38 and 75 is supported in an axial direction by a foil thrust bearing 80.

Various coolant ports are provided for the engine core 50. Provided are ports 82 and 84 for circulating a coolant over the stator windings 40. Also provided are ports 86 and 88 for circulating a coolant over the bearings 76, 78 and 80.

The power generating system 10 can be built in several major modules such as a rotating module, a heat exchanger module, a combustor module, and an electronics module. Each of these modules is relatively lightweight and compact. The modules can be replaced without breaking liquid lines. The use of foil bearings 76, 78 and 80 eliminates the need for an oil-based lubrication system and, therefore, results in low maintenance of the power generating system 10. Scheduled maintenance would consist primarily of replacing the igniter 27, the filter 59 and catalyst elements in the combustor 24.

The power generating system 10 operates on a conventional recuperated Brayton cycle. The Brayton cycle can be operated on a relatively low pressure ratio (e.g., 3.8) to maximize overall efficiency; since, in recuperated cycles, the lower the pressure ratio, the closer the turbine exhaust temperature is to the inlet temperature. This allows heat addition to the cycle at high temperature and, in accordance with the law of Carnot, reduces the entropic losses associated with supplying heat to the cycle. This high temperature heat addition results in an increased overall cycle efficiency.

The values that follow are provided merely by way of example. Air is compressed in a single stage radial compressor to 3.8 bars. The compressed air can be directed to the recuperator 22 where the temperature of the compressed air is increased using the waste heat of the turbine exhaust gas. The temperature of the exhaust gas from the turbine is limited to about 1,300° F. in order to help extend the life of the recuperator 22. For exhaust gas temperatures above 1,300° F., the recuperator 22 can be made of super alloys instead of stainless steel. The recuperator 22 can be designed for either 85% or 90% effectiveness depending on the economic needs of the customer. In the most efficient configuration, and using the 90% recuperation, the overall net cycle efficiency is 30%, yielding a high heating value heat rate of approximately 11,900 BTU/kWh on diesel.

After being heated in the recuperator 22, the compressed air is directed to the combustor 24, where additional heat is added to raise the temperature of the compressed air to 1,650° F. A combustor 24 designed according to a conventional design can yield a NOx level of less than 25 ppm, and a combustor 24 using a catalyst can yield a NOx rate that is virtually undetectable (commercial NOx sensors are limited to a 2 to 3 ppm detection range). The high enthalpic gas is then expanded through the turbine 14. The compressor 12, the turbine 14, the generator 16, and the the shaft 75—the only moving part in the engine core 50—spins at high speeds of approximately 80,000 rpm or more. The resulting high frequency of around 1,200 hertz is then reduced with the inverter 38 to a grid-compatible 50 or 60 cycles. Resulting is a high power density typified by low weight (about a third of the size of a comparable diesel generator) and a small footprint (for example, approximately 3 feet by 5 feet by 6 feet high).

The high power density and low weight of the technology is made possible through the high speed components which permits large amounts of power using a minimum of material. The unit is completely self-contained in a weather proof enclosure. The power generating system 10 is "plug and play" technology, requiring little more than a supply of clean fuel, liquid or gas.

Thus disclosed is an exhaust diffuser 66 that lowers the temperature of the turbine exhaust stream and thereby allows the turbine 14 to be fired at higher temperatures during part-load operation without damaging the recuperator 22. Resulting is higher efficiency during part-load operation.

The power generating system 10 can use multiple fuels including natural gas, diesel and JP-8. The power generating system 10 has a low thermal signature and minimal noise generation. The use of air bearings eliminates the need for an oil-based lubrication system. The electrical generation system 10 has high reliability and minimal service requirements due to single moving part design. The use of a solid-state electronic inverter allows the system 10 to provide a variable ac output. Installation is easy due to a modular and self contained design, and servicing is easy because the system 10 has one moving part and major parts that are easily accessible. The width, length and height of the engine core 50 can be adjusted to fit a wide variety of dimensional requirements.

The power generating system 10 is smaller, lighter, more fuel-efficient and has lower thermal signature, noise, maintenance and cost penalties than comparable internal combustion engines. Therefore, due to its low installation costs, high efficiency, high reliability and simple, low cost maintenance, the electrical power generating system 10 provides lower operating and fixed costs than power generators of comparable size.

Potential applications for the power generating system 10 are many and diverse. Applications include use in off-grid applications for standalone power, on-grid applications for peak shaving, load following or base load service, emergency back-up and uninterruptible power supply, prime mover applications (e.g., pump, air conditioning) and automotive hybrid vehicles.

The invention is not limited to the specific embodiments disclosed above. Therefore, the present invention is construed according to the claims that follow.

What is claimed is:

1. A microturbine power generating system for producing power comprising:

a compressor for providing a stream of pressurized air;

a combustor for igniting a fuel and the pressurized air to generate a hot, expanding gas;

a turbine for converting the hot, expanding gas into mechanical energy, the turbine including a diffuser for diffusing a turbine exhaust stream, the diffuser having a plurality of openings, the openings allowing ambient air to be drawn into the turbine exhaust stream the turbine exhaust stream being cooled by the air drawn through the openings; and a recuperator for recovering heat from the exhaust stream leaving the diffuser.

2. The system of claim 1, wherein the diffuser includes a sidewall, the openings being circumferentially disposed around the sidewall.

3. The system of claim 2, wherein the openings are located along a transverse plane of the diffuser.

4. The system of claim 1, further comprising:

a power converter for converting the mechanical energy produced by the turbine into electrical energy; and a single shaft connecting the turbine and power converter in prestressed relation to allow the power converter to rotate in unison with the turbine and to thereby use the mechanical energy extracted by the turbine to produce power.

* * * * *